(12) United States Patent
Staples

(10) Patent No.: US 9,011,282 B2
(45) Date of Patent: Apr. 21, 2015

(54) BICYCLE SPROCKET FOR USE WITH A MULTI-GEAR REAR CASSETTE

(71) Applicant: D3 Innovation Inc., Squamish (CA)

(72) Inventor: Jonathan Staples, Squamish (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 14/550,569

(22) Filed: Nov. 21, 2014

(65) Prior Publication Data

US 2015/0080160 A1  Mar. 19, 2015

(51) Int. Cl.
  *F16H 55/12* (2006.01)
  *F16H 55/30* (2006.01)
  *B62M 9/12* (2006.01)

(52) U.S. Cl.
  CPC ...................... *B62M 9/12* (2013.01)

(58) Field of Classification Search
  CPC ......... B62M 9/10; B62M 9/105; F16H 55/30; F16H 7/06; F16D 41/30
  USPC ....................................... 474/160
  See application file for complete search history.

(56) References Cited

U.S. PATENT DOCUMENTS

| | | | | |
|---|---|---|---|---|
| 3,477,303 A | * | 11/1969 | Brilando | 474/144 |
| 3,550,465 A | * | 12/1970 | Maeda | 474/151 |
| 4,044,621 A | * | 8/1977 | McGregor et al. | 474/144 |
| 4,348,200 A | * | 9/1982 | Terada | 474/160 |
| 4,472,163 A | * | 9/1984 | Bottini | 474/160 |
| 4,816,013 A | * | 3/1989 | Kapela et al. | 474/160 |
| 5,087,226 A | * | 2/1992 | Nagano | 474/160 |
| 5,194,051 A | * | 3/1993 | Nagano | 474/160 |
| 5,503,600 A | * | 4/1996 | Berecz | 474/160 |
| 5,733,215 A | * | 3/1998 | Hsu et al. | 474/160 |
| 5,738,603 A | * | 4/1998 | Schmidt et al. | 474/158 |
| 5,788,593 A | * | 8/1998 | Tiong | 474/160 |
| 5,876,296 A | * | 3/1999 | Hsu et al. | 474/160 |
| 5,935,034 A | * | 8/1999 | Campagnolo | 474/160 |
| 5,947,852 A | * | 9/1999 | Moretz | 474/161 |
| 5,954,604 A | * | 9/1999 | Nakamura | 474/160 |

(Continued)

FOREIGN PATENT DOCUMENTS

EP      1972539 A2     9/2008

OTHER PUBLICATIONS

Photographs (4), EbayTM User (http://stores.ebay.ca/mtbtools), known by Applicant to have been made available to the public in approximately 2010.
Photographs (3), German forum user, "Mirfe" (http://www.mtb-news.de/forum/m/mirfe.114430/) known by Applicant to have been made available to the public in approximately 2011.
Photographs (3), e-thirteenTM, The Hive (http://bythehive.com/e-thirteen) known by Applicant to have been made available to the public in approximately May 2014.

(Continued)

*Primary Examiner* — Henry Liu
(74) *Attorney, Agent, or Firm* — Oyen Wiggs Green & Mutala LLP

(57) ABSTRACT

A rear bicycle sprocket for use with a multi-gear rear cassette is provided. The sprocket includes a chain engaging portion and a mounting portion having generally annular shape about a central axis and a plurality of support arms, integrally formed with the chain engaging portion and with the mounting portion. The sprocket further includes a plurality of space maintaining protrusions, each space maintaining protrusion extending axially forwardly from an axially forward surface of a corresponding support arm and integrally formed therewith. A multi-gear rear cassette having a plurality of sprockets coaxially mounted together wherein the plurality of sprockets includes the rear bicycle sprocket mounted axially rearmost and a bicycle including the multi-gear rear cassette are further provided.

20 Claims, 8 Drawing Sheets

(56) References Cited

U.S. PATENT DOCUMENTS

| | | | |
|---|---|---|---|
| 5,971,878 A * | 10/1999 | Leng | 474/78 |
| 6,264,575 B1 * | 7/2001 | Lim et al. | 474/77 |
| 6,293,884 B1 * | 9/2001 | Chattin | 474/160 |
| 6,428,437 B1 * | 8/2002 | Schlanger | 474/160 |
| 7,846,047 B2 * | 12/2010 | Nakano et al. | 474/152 |
| 7,871,347 B2 * | 1/2011 | Kamada | 474/160 |
| 7,967,709 B2 * | 6/2011 | Emura et al. | 474/161 |
| 8,057,338 B2 * | 11/2011 | Kamada | 474/160 |
| 2005/0009654 A1 * | 1/2005 | Kanehisa et al. | 474/152 |
| 2006/0172840 A1 * | 8/2006 | Kamada | 474/152 |
| 2007/0054770 A1 * | 3/2007 | Valle | 474/160 |
| 2008/0004143 A1 * | 1/2008 | Kanehisa et al. | 474/160 |
| 2008/0058144 A1 * | 3/2008 | Oseto et al. | 474/160 |
| 2008/0188336 A1 * | 8/2008 | Tokuyama | 474/160 |
| 2009/0042680 A1 * | 2/2009 | Valle | 474/160 |
| 2009/0042682 A1 * | 2/2009 | Dal Pra' et al. | 474/160 |
| 2009/0098966 A1 * | 4/2009 | Kamada | 474/160 |
| 2010/0009794 A1 * | 1/2010 | Chiang | 474/160 |
| 2010/0099530 A1 * | 4/2010 | Chiang et al. | 474/160 |
| 2010/0137086 A1 * | 6/2010 | Lin | 474/160 |
| 2011/0092327 A1 * | 4/2011 | Oishi | 474/160 |
| 2011/0105263 A1 * | 5/2011 | Braedt | 474/160 |
| 2012/0196711 A1 * | 8/2012 | Loy et al. | 474/160 |
| 2012/0225745 A1 * | 9/2012 | Oishi et al. | 474/160 |
| 2012/0244978 A1 * | 9/2012 | Liao et al. | 474/160 |
| 2012/0302384 A1 * | 11/2012 | Braedt | 474/160 |
| 2012/0322598 A1 * | 12/2012 | Lin | 474/160 |

OTHER PUBLICATIONS

Photographs (3), twenty6TM (http://www.twenty6products.com) known by Applicant to have been made available to the public in approximately Mar. 2014.

Photographs (3), HopeTM (http://www.hopetech.com) known by Applicant to have been made available to the public in approximately Apr. 2014.

Photographs (3), Guerilla GravityTM (http://ridegg.conn) known by Applicant to have been made available to the public in approximately Apr. 2014.

Photographs (3), Absolute BlackTM (http://www.absoluteblack.cc) known by Applicant to have been made available to the public in approximately May 2014.

Photographs (3), Wolf ToothTM (http://www.wolftoothcycling.com) known by Applicant to have been made available to the public in approximately Feb. 2014.

Website print-out, www.wolftoothcycling.com (Dec. 15, 2014).

Website print-out, http://ridegg.com/wide-range-cassette-cog (Dec. 15, 2014).

Website print-out, http://www.hopetech.com/product/40t-rex/ (Dec. 15, 2014).

Website print-out, http://shop.twenty6products.com/Cog_c15.htm (Dec. 15, 2014).

Website print-out, http://bythehive.com/e-thirteen/components/extended-range-ex-cog/ (Dec. 15, 2014).

* cited by examiner

BICYCLE SPROCKET FOR USE WITH A MULTI-GEAR REAR CASSETTE

TECHNICAL FIELD

The present invention relates to a bicycle sprocket and, more specifically, to a rear bicycle sprocket for use with a multi-gear rear cassette and to a multi-gear rear cassette and a bicycle having a multi-gear rear cassette including the rear sprocket.

BACKGROUND

In a conventional bicycle multi-gear rear cassette, a plurality of sprockets of variable diameter are axially distributed along and co-axially mounted to a freehub body. Each sprocket has a plurality of teeth about its perimeter for engaging a bicycle chain. For example, a mountain bicycle rear cassette with ten sprockets, $S_1$-$S_{10}$, could have sprockets with the following teeth (T) profiles: 11T, 13T, 15T, 17T, 19T, 21T, 24T, 28T, 32T, and 36T (i.e., 11T to 36T). When a shift control device is actuated by a bicyclist, a rear derailleur transfers the chain from the teeth of one sprocket to another.

To reduce the weight of the cassette, a sprocket carrier has been used to support a plurality of sprockets. A relatively low density metal such as aluminum is typically used for the carrier, while various types of steel materials provide the sprockets with adequate strength. The carrier comprises a plurality of radially extending mounting arms. Each mounting arm includes a sprocket mounting portion. Fasteners, such as bolts, mating threads, coupling projections, rivets, and the like, are used to fasten the sprockets to the sprocket mounting portion of the carrier. These mechanical connections not only require additional materials making the sprocket assembly heavier, but also weaken the mating parts and provide possible fatigue and fracture failure points on both the sprockets and carrier. Further, such mechanical connections introduce additional unwanted flexibility as they twist and deform under loading.

It may be desirable to increase the number of sprockets available in a bicycle multi-gear rear cassette to provide the bicyclist with a greater choice of gears. In relatively recent years, the number of sprockets in a typical mountain bicycle multi-gear rear cassette has increased from nine to ten sprockets. Even more recently, the number of sprockets has increased from ten to eleven. By increasing the number of sprockets, the bicyclist may be able to increase the range of the multi-gear rear cassette (i.e., the ratio derived from dividing the teeth profile of the sprocket having the largest diameter by the teeth profile of the sprocket having the smallest diameter) thereby providing the bicyclist with a greater range of gears to choose from. Thus, the range of a typical mountain bicycle multi-gear rear cassette having ten sprockets ranging from 11T to 36T has a range of 327%, which is greater than the range of a typical mountain bicycle multi-gear cassette having nine sprockets ranging from 11T to 34T (i.e., a 309% range). The range of a typical mountain bicycle multi-gear cassette having eleven sprockets ranging from 10T to 42T is greater still (i.e., 420%).

While a drivetrain having an eleven sprocket rear cassette is advantageous to bicyclists due to the enhanced range, an eleven sprocket rear cassette is incompatible with drivetrains designed for use with nine or ten sprocket rear cassettes. For a bicyclist to install an eleven sprocket rear cassette on a bicycle having a drivetrain using a nine or ten sprocket cassette, the bicyclist must purchase and install a new bicycle chain, rear derailleur, shift control device, and/or front chain rings. This can be prohibitively expensive.

There is a general desire to increase the range of gears available to a bicyclist without the bicyclist having to make substantial changes to the drivetrain and/or considerably increasing the weight of the bicycle.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

One aspect of the present invention provides a bicycle sprocket for use with a multi-gear rear cassette that improves the gear range of the cassette and can be used with most conventional drivetrains designed for use with a ten sprocket rear cassette.

Another object of the present invention is to provide a bicycle multi-gear rear cassette having an improved gear range that can be installed for use with most conventional drivetrains designed for use with a ten sprocket rear cassette.

One aspect of the present invention provides a bicycle sprocket for use with a multi-gear rear cassette. The sprocket includes a chain engaging portion and a mounting portion, both having a generally annular shape about a central axis. A radially outward edge of the chain engaging portion comprises a plurality of circumferentially spaced and radially outwardly extending teeth for mechanical engagement with a bicycle chain. A radially inward edge of the mounting portion defines an aperture shaped to receive therein a freehub body. A radially outward edge of the mounting portion is radially spaced apart from a radially inward edge of the chain engaging portion. A plurality of spaced support arms, integrally formed with the chain engaging portion and with the mounting portion, extends radially outwardly from the radially outward edge of the mounting portion to the radially inward edge of the chain engaging portion. The sprocket further includes a plurality of space maintaining protrusions, each space maintaining protrusion integrally formed with and extending axially forwardly from an axially forward surface of a corresponding support arm.

In some embodiments, an axially forward surface of the mounting portion and an axially forward surface of each space maintaining protrusion extend further axially forwardly than an axially forward surface of the chain engaging portion.

In some embodiments, the axially forward surface of the mounting portion extends further axially forwardly than the axially forward surface of each space maintaining protrusion.

In some embodiments, the support arms may be circumferentially spaced apart from one another about the radially outward edge of the mounting portion and/or about the radially inward edge of the chain engaging portion.

In some embodiments, the support arms may be circumferentially spaced apart from one another at the radially inward edge of the chain engaging portion and may merge with the circumferentially adjacent support arms at the radially outward edge of the mounting portion.

In some embodiments, the support arms may be circumferentially spaced apart from one another at the radially outward edge of the mounting portion and may merge with the circumferentially adjacent support arms at the radially inward edge of the chain engaging portion.

In some embodiments, the support arms may merge with circumferentially adjacent support arms at the radially outward edge of the mounting portion and at the radially inward edge of the chain engaging portion and may be circumferentially spaced apart at radial locations therebetween.

In some embodiments, the support arms may be circumferentially spaced apart from one another at the radially outward edge of the mounting portion and the radially inward edge of the chain engaging portion and may merge with circumferentially adjacent support arms at radial locations therebetween.

In some embodiments, each support arm includes a radially inward arm portion and a plurality of radially outward arm potions. The radially inward arm portion extends radially outwardly from the radially outward edge of the mounting portion and the plurality of radially outward arm portions extend radially outwardly from a radially outward edge of the radially inward arm portion to the radially inward edge of the chain engaging portion.

In some embodiments, each support arm includes a radially outward arm portion extending radially inwardly from the radially inward edge of the chain engaging portion and a plurality of radially inward arm portions extending radially inwardly from a radially inward edge of radially outward arm portion to the radially outward edge of the mounting portion.

Another aspect of the present invention provides a bicycle multi-gear rear cassette having a plurality of sprockets coaxially mounted to a freehub body wherein the plurality of sprockets includes an axially rearmost sprocket. The axially rearmost sprocket includes a chain engaging portion and a mounting portion, both having a generally annular shape about a central axis. A radially outward edge of the chain engaging portion comprises a plurality of circumferentially spaced and radially outwardly extending teeth for mechanical engagement with a bicycle chain. A radially inward edge of the mounting portion defines an aperture shaped to receive therein a freehub body. A radially outward edge of the mounting portion is radially spaced apart from a radially inward edge of the chain engaging portion. A plurality of spaced support arms, integrally formed with the chain engaging portion and with the mounting portion, extends radially outwardly from the radially outward edge of the mounting portion to the radially inward edge of the chain engaging portion. The sprocket further includes a plurality of space maintaining protrusions, each space maintaining protrusion integrally formed with and extending axially forwardly from an axially forward surface of a corresponding support arm.

Another aspect of the present invention provides a bicycle comprising a multi-gear rear cassette having a plurality of sprockets coaxially mounted to a freehub body, wherein the plurality of sprockets includes an axially rearmost sprocket. The axially rearmost sprocket includes a chain engaging portion and a mounting portion, both having a generally annular shape about a central axis. A radially outward edge of the chain engaging portion comprises a plurality of circumferentially spaced and radially outwardly extending teeth for mechanical engagement with a bicycle chain. A radially inward edge of the mounting portion defines an aperture shaped to receive therein a freehub body. A radially outward edge of the mounting portion is radially spaced apart from a radially inward edge of the chain engaging portion. A plurality of spaced support arms, integrally formed with the chain engaging portion and with the mounting portion, extends radially outwardly from the radially outward edge of the mounting portion to the radially inward edge of the chain engaging portion. The sprocket further includes a plurality of space maintaining protrusions, each space maintaining protrusion integrally formed with and extending axially forwardly from an axially forward surface of a corresponding support arm.

Another aspect of the present invention provides a method for installing a rear bicycle sprocket for use with a multi-gear rear cassette. The method includes the steps of removing the sprockets from a freehub body of a multi-gear rear cassette, discarding at least one of the removed sprockets, mounting a rear sprocket to the freehub body, and mounting the remaining removed sprockets to the freehub body axially forwardly of the rear sprocket. The rear sprocket includes a chain engaging portion and a mounting portion, both having a generally annular shape about a central axis. A radially outward edge of the chain engaging portion comprises a plurality of circumferentially spaced and radially outwardly extending teeth for mechanical engagement with a bicycle chain. A radially inward edge of the mounting portion defines an aperture shaped to receive therein a freehub body. A radially outward edge of the mounting portion is radially spaced apart from a radially inward edge of the chain engaging portion. A plurality of spaced support arms, integrally formed with the chain engaging portion and with the mounting portion, extends radially outwardly from the radially outward edge of the mounting portion to the radially inward edge of the chain engaging portion. The sprocket further includes a plurality of space maintaining protrusions, each space maintaining protrusion integrally formed with and extending axially forwardly from an axially forward surface of a corresponding support arm.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
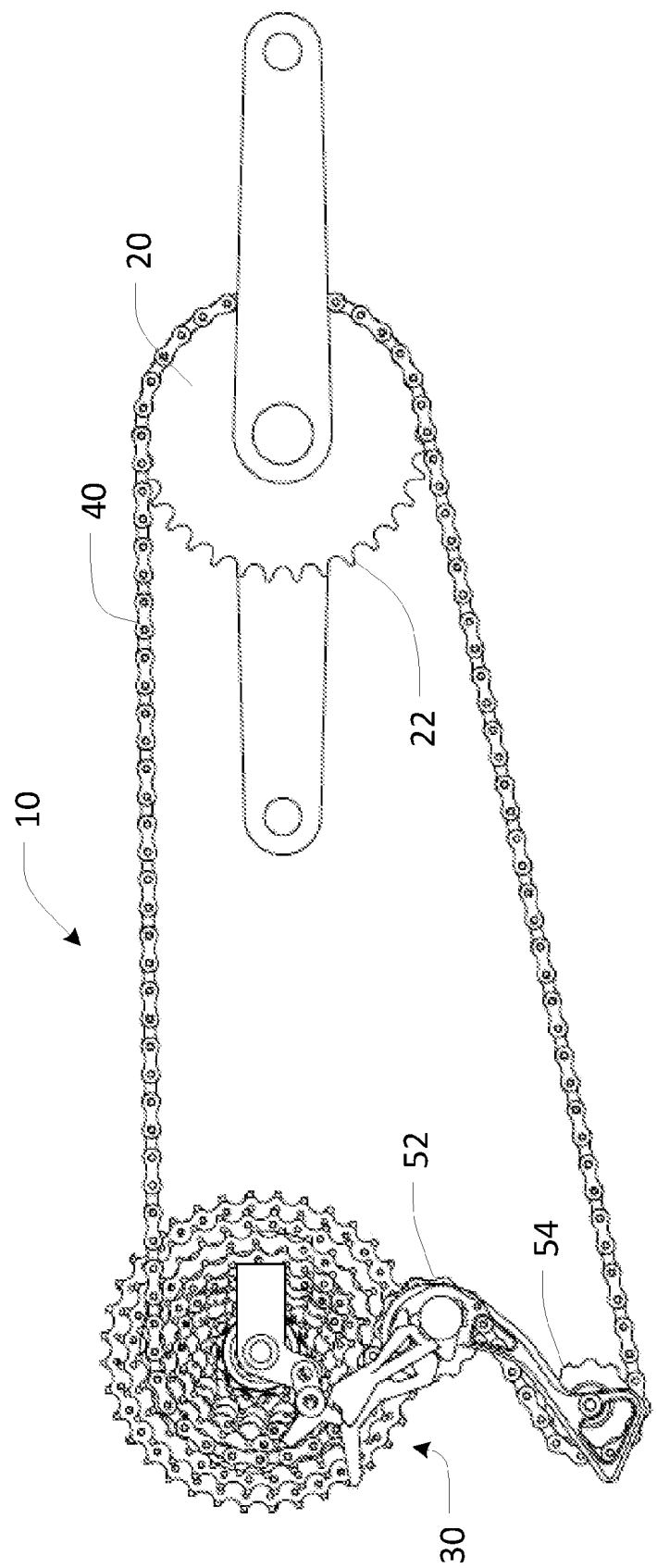
FIG. 1 is an axially forward-side elevation view of the drivetrain of a conventional bicycle.

A drivetrain 10 of a conventional multi-speed bicycle, as shown in FIG. 1, typically includes a front crankset 20, a multi-gear rear cassette 30, and a chain 40 that connects front crankset 20 to rear cassette 30. Crankset 20 is rotatably mounted to a bicycle frame (not shown) via a bottom bracket (not shown) and cassette 30 is rotatably mounted to a rear wheel (not shown). Pedaling motion of a bicyclist is transferred into rotational motion of crankset 20, which drives chain 40 to rotate cassette 30 and rotate the rear wheel of the bicycle. Crankset 20 includes one or more chainrings 22 coaxially mounted and having varying diameters.

Cassette 30 includes a plurality of sprockets coaxially mounted and having varying diameters. An exemplary cassette, shown in FIG. 2, includes ten sprockets, $S_1$-$S_{10}$, coaxially mounted to a freehub body (not shown). $S_1$ has the largest diameter and is mounted to the freehub body axially rearwardly of $S_2$-$S_{10}$. $S_2$-$S_{10}$ have progressively smaller diameters and are mounted to the freehub body progressively axially forwardly of $S_1$, with $S_{10}$ mounted axially forwardly of $S_1$-$S_9$. In some embodiments, $S_1$-$S_{10}$ may have the following teeth (T) profiles: 11T, 13T, 15T, 17T, 19T, 21T, 24T, 28T, 32T, and 36T. In some embodiments, $S_1$-$S_{10}$ may have the following teeth (T) profiles: 11T, 12T, 14T, 16T, 18T, 21T, 24T, 28T, 32T, and 36T. Persons skilled in the art will recognize that ten-sprocket rear cassettes may have a variety of teeth profiles. A drivetrain including a single front chainring 22 and a rear cassette 30 having ten sprockets (as shown in the FIG. 1 example) is referred to as a 1×10 drivetrain. A drivetrain including two front chainrings and a cassette having ten sprockets (not shown) is referred to as a 2×10 drivetrain.

Unless the context dictates otherwise, the terms "axial", "axially", and/or the like (as used herein) refer to directions that are parallel to central axis 2 of a bicycle sprocket, of a rear cassette, or of sprockets in the rear cassette, or, where the context dictates, have components that extend in directions parallel to central axis 2. Unless the context dictates otherwise, the terms "axially forward", "axially forwardly", "axially foremost", and/or the like (as used herein) refer to directions that are parallel to central axis 2 and extend out of the page with reference to FIGS. 1, 2, 3, 4, 8, and 9, into the page with reference to FIGS. 5 and 7, and to the right of the page with reference to FIG. 6 or, where the context dictates, have components that extend parallel to central axis 2 and extend out of the page with reference to FIGS. 1, 2, 3, 4, 8, and 9, into the page with reference to FIGS. 5 and 7, and to the right of the page with reference to FIG. 6. Unless the context dictates otherwise, the terms "axially rearward", "axially rearwardly", "axially rearmost", and/or the like (as used herein) refer to directions that are parallel to central axis 2 and extend into the page with reference to FIGS. 1, 2, 3, 4, 8, and 9, out of the page with reference to FIGS. 5 and 7, and to the left of the page with reference to FIG. 6 or, where the context dictates, have components that extend parallel to central axis 2 and extend into the page with reference to FIGS. 1, 2, 3, 4, 8, and 9, out of the page with reference to FIGS. 5 and 7, and to the left of the page with reference to FIG. 6.

Unless the context dictates otherwise, the terms "radially outward", "radially outwardly", and/or the like (as used herein) refer to directions that extend generally orthogonal to and away from central axis 2 or, where the context dictates, have components that extend generally orthogonal to and away from central axis 2. Unless the context dictates otherwise, the terms "radially inward", "radially inwardly", and/or the like (as used herein) refer to directions that extend generally orthogonal and toward central axis 2 or, where the context dictates, have components that extend generally orthogonal to and toward central axis 2. Unless the context dictates otherwise, the terms "radial", "radially", and/or the like (as used herein) refer to directions that are either radially inward, radially outward, or both. Although the term "radial" is most commonly used in connection with circular objects or features, it should be understood for the purpose of this description and accompanying aspects that the term "radial" is used in a broader context and is not limited to describing strictly circular objects or features or objects or features with strictly circular cross-section.

Chain 40 selectively engages one of sprockets $S_1$-$S_{10}$ of cassette 30 and chainring 22 of crankset 20. A rear derailleur 50 having a guide pulley 52 and a tension pulley 54 is provided to move chain 40 between sprockets $S_1$-$S_{10}$. In some embodiments, a front derailleur (not shown) having a chain guide (not shown) may be provided to move chain 40 between front chainrings of a crankset having more than one chainring. Shift control devices (not shown) operated by the bicyclist are used to control the front and rear derailleurs.

Figure 3:
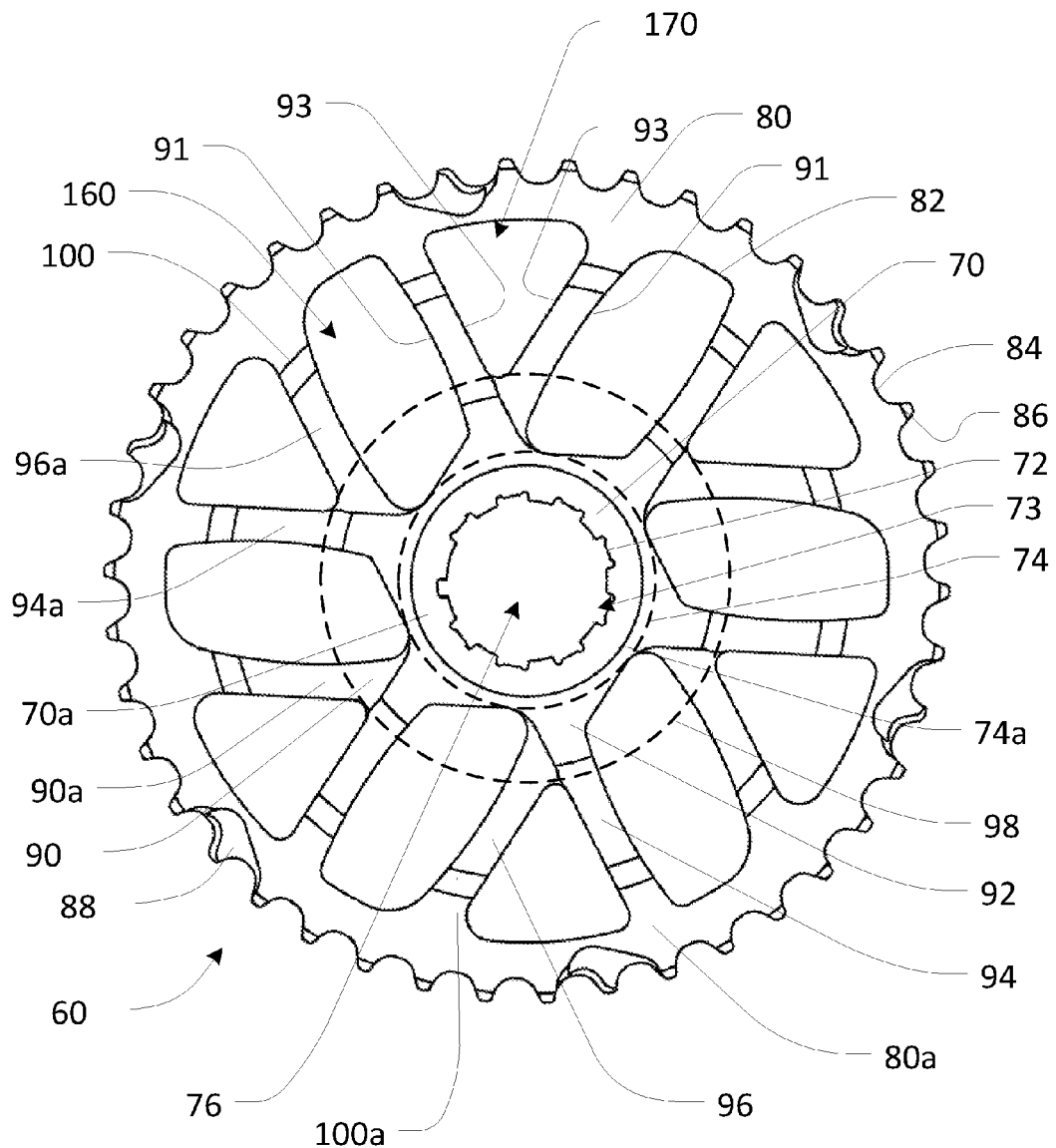
FIG. 3 is an axially forward-side elevation view of a rear bicycle sprocket according to an embodiment of the present invention.
Figure 4:
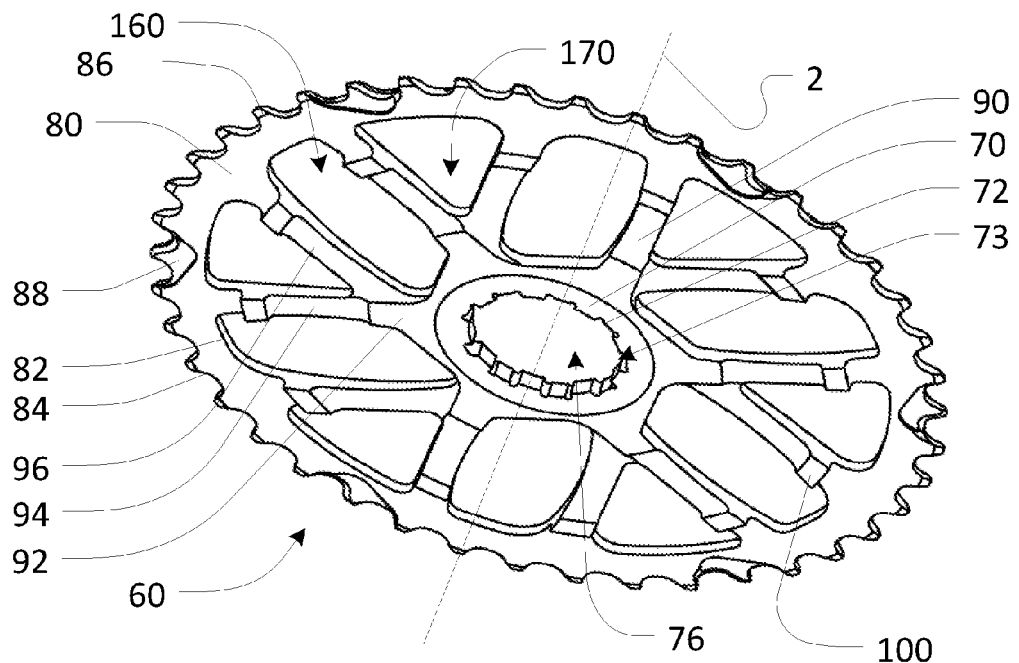
FIG. 4 is an axially forward-side isometric view of the FIG. 3 embodiment.
Figure 5:
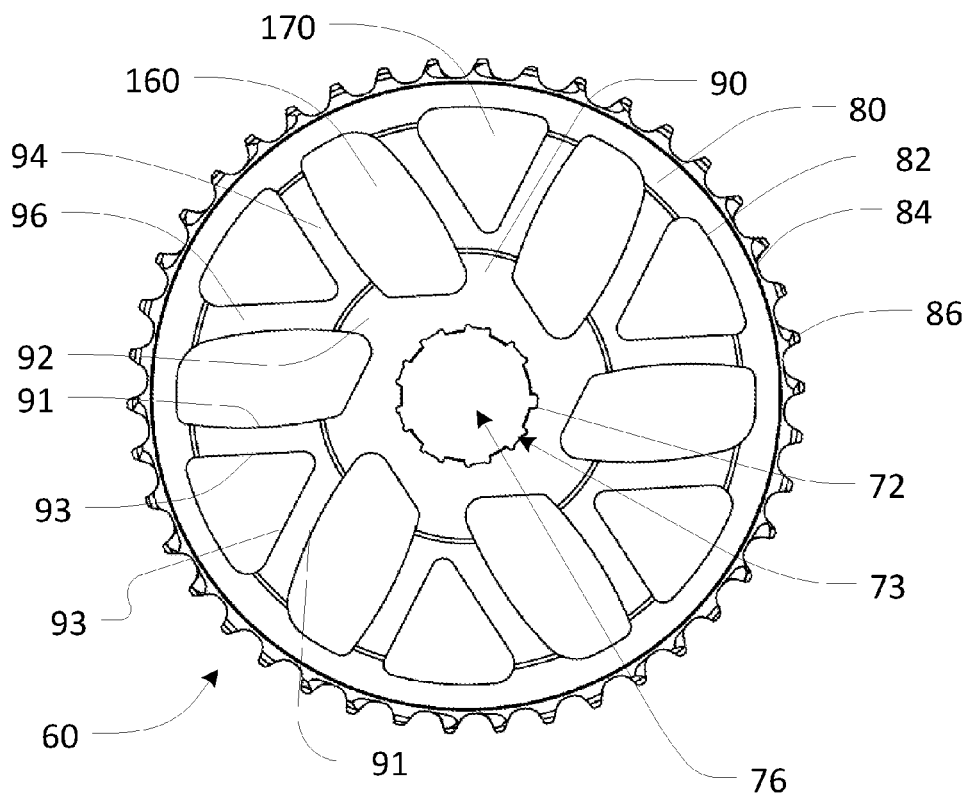
FIG. 5 is an axially rearward-side elevation view of the FIG. 3 embodiment.

FIGS. 3-5 show various views of a sprocket 60 according to a particular embodiment. Sprocket 60, shown in FIGS. 3-5, comprises a mounting portion 70 and a chain engaging portion 80, each having an annular shape about central axis 2. Although the term "annular" is most commonly used in connection with objects and/or features having circular profiles, it should be understood for the purpose of this description and accompanying claims that the term "annular" is used in a broader context and is not limited to describing strictly circular objects or features or objects or features with strictly circular profiles or cross-sections. Mounting portion 70 comprises a radially inward edge 72 and a radially outward edge 74. Radially inward edge 72 defines an aperture 76 shaped to receive therein a freehub body 32. Chain engaging portion 80 includes a radially inward edge 82 and a radially outward edge 84. Radially outward edge 74 of mounting portion 70 is radially spaced apart from radially inward edge 82 of chain engaging portion 80. Radially outward edge 84 of chain engaging portion 80 comprises a plurality of circumferentially spaced and radially outwardly extending teeth 86 for mechanical engagement with a bicycle chain in the usual way. In some embodiments, chain engaging portion 80 may be provided with 40 or 42 teeth 86. In some other embodiments, chain engaging portion 80 may be provided with different numbers of teeth 86.

A plurality of support arms 90 extend radially outwardly from radially outward edge 74 of mounting portion 70 to radially inward edge 82 of chain engaging portion 80. Support arms 90 may be circumferentially spaced apart from one another about radially outward edge 74 of mounting portion 70 and/or about radially inward edge 82 of chain engaging portion 80. In some embodiments, support arms 90 may be circumferentially spaced apart from one another at radially inward edge 82 of chain engaging portion 80 and my merge with circumferentially adjacent support arms 90 at radially outward edge 74 of mounting portion 70. In some embodiments, support arms 90 may be circumferentially spaced apart from one another at radially outward edge 74 of mounting portion 70 and may merge with circumferentially adjacent support arms 90 at radially inward edge 82 of chain engaging portion 80. In some embodiments, support arms 90 may merge with circumferentially adjacent support arms 90 at radially outward edge 74 of mounting portion 70 and at radially inward edge 82 of chain engaging portion 80 and may be circumferentially spaced apart at radial locations therebetween. In some embodiments, support arms 90 may be circumferentially spaced apart from one another at radially outward edge 74 of mounting portion 70 and radially inward edge 82 of chain engaging portion 80 and may merge with circumferentially adjacent support arms 90 at radial locations therebetween. Support arms 90 are integrally formed with mounting portion 70 and chain engaging portion 80. Sprocket 60 further comprises a plurality of space maintaining protrusions 100. Each space maintaining protrusion 100 extends axially forwardly from an axially forward surface 90a of a corresponding support arm 90. Each space maintaining protrusion 100 is integrally formed with its corresponding support arm 90—i.e., space maintaining protrusions 100 and support arms 90 are monolithically fabricated (i.e., as one piece). The distance between space maintaining protrusions 100 and mounting portion 70 may be optimized to resist deformation of sprocket 60 when in use.

In some embodiments, an axially forward surface 70a of mounting portion 70 and an axially forward surface 100a of each space maintaining protrusion 100 extend further axially forwardly than an axially forward surface 80a of chain engaging portion 80. In some embodiments, axially forward surface 70a of mounting portion 70 extends further axially forwardly than axially forward surface 100a of each space maintaining protrusion 100 and axially forward surface 100a of each space maintaining protrusion 100 extends further axially forwardly than axially forward surface 80a of chain engaging portion 80.

The number of support arms 90 may be sufficient to support chain engaging portion 80 and withstand forces and torques associated with bicycle riding to prevent or mitigate deformation of sprocket 60. However, it may be desirable to minimize the number of support arms 90 to minimize the corresponding weight of sprocket 60. A person skilled in the art would recognize that there is also a trade-off between the durability and weight provided by the number of support arms 90 and by the axial thickness of sprocket 60 and that these parameters can be adjusted depending on desired weight versus durability objectives. In the illustrated embodiment, sprocket 60 comprises six support arms 90. In some embodiments, sprocket 60 may comprise other numbers of support arms 90.

In the illustrated embodiment, each support arm 90 comprises a radially inward arm portion 92 extending radially outwardly from radially outward edge 74 of mounting portion 70 and a plurality of radially outward arm portions 94, 96 extending radially outwardly from a radially outward edge 98 of radially inward arm portion 92 to radially inward edge 82 of chain engaging portion 80. Radially outward arm portions 94, 96 may be circumferentially spaced apart from one another at radially inward edge 82 of chain engaging portion 80 but each radially outward arm portion 94, 96 may merge into one another where they meet radially outward edge 98 of radially inward arm portion 92. In some embodiments, each support arm 90 includes two or more radially outward arm portions. In some embodiments, each support arm 90 comprises a radially outward arm portion (not shown) extending radially inwardly from radially inward edge 82 of chain engaging portion 80 and a plurality of radially inward arm portions (not shown) extending radially inwardly from a radially inward edge (not shown) of radially outward arm portion to radially outward edge 74 of mounting portion 70. Radially inward arm portions (not shown) may be circumferentially spaced apart from one another at radially outward edge 74 of mounting portion 70 but each radially inward arm portion may merge into one another where they meet radially inward edge (not shown) of radially outward arm portion (not shown). In the illustrated embodiments, each space maintaining protrusion 100 extends axially forwardly from a corresponding axially forward surface 94a, 96a of radially outward arm portion 94, 96 and is integrally formed with its corresponding radially outward arm portion 94, 96.

In the illustrated embodiment, sprocket 60 comprises two radially outward arm portions 94, 96. In some embodiments, sprocket 60 and/or each support arm 90 may comprise other numbers of radially outward arm portions.

Sprocket 60 may be constructed in one piece, preferably of lightweight, rigid material such as a suitable metal, metal alloy, carbon fibre, or the like. For example, sprocket 60 may be machined, stamped, punched, forged, cast, injection moulded, or made using three-dimensional printing techniques. Sprocket 60 may be made of aluminum, titanium, or steel. Since sprocket 60 may be constructed in one piece (i.e., integrally) and does not include non-integral features, sprocket 60 is not susceptible to the corrosion generally associated with using dissimilar metals or to mechanical weakness attributable to the vibrations, forces, and/or torques associated with riding a bicycle when sprocket 60 is in use.

Figure 2:
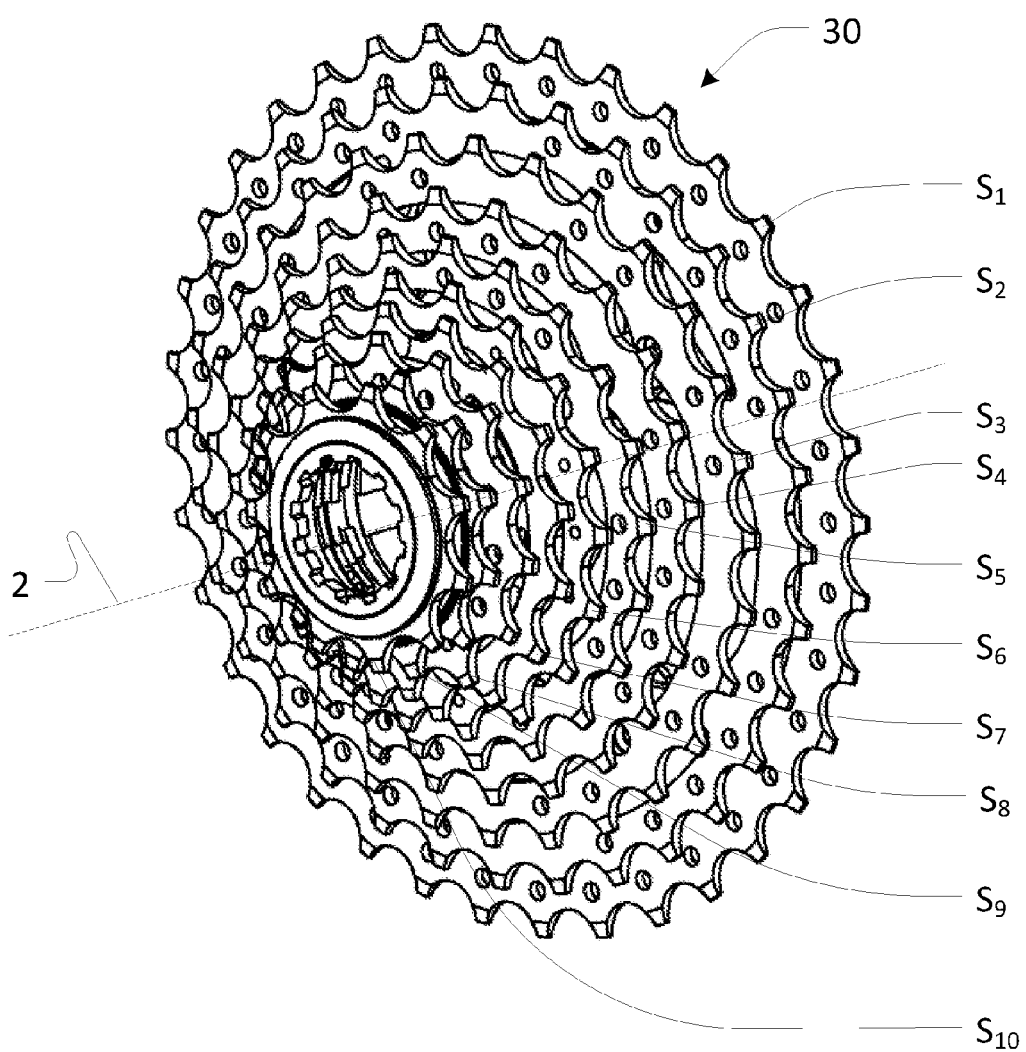
FIG. 2 is an axially forward-side isometric view of a conventional ten-sprocket bicycle rear cassette.
Figure 8:
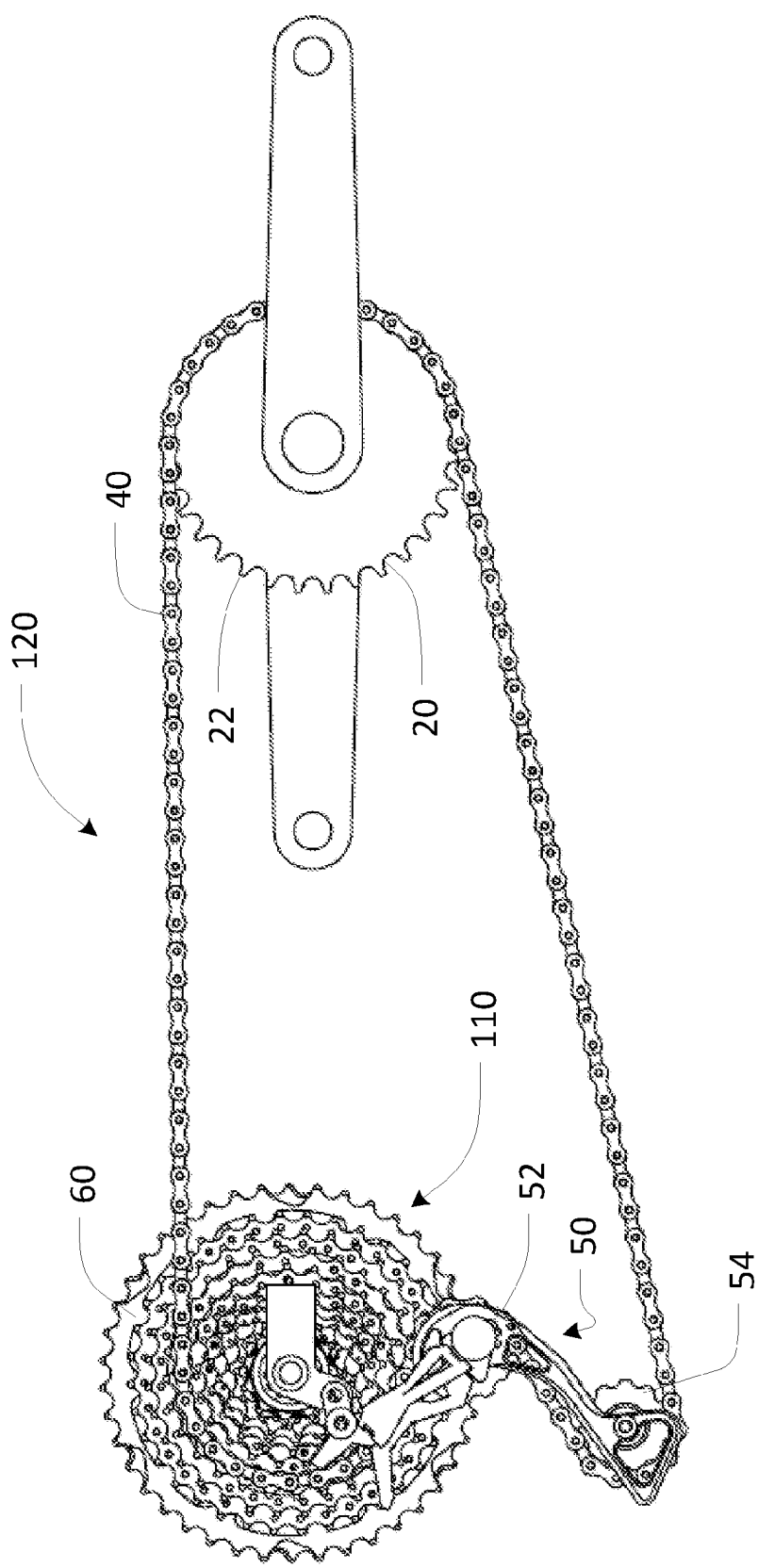
FIG. 8 is an axially forward-side elevation view of a drivetrain of a bicycle including the FIG. 3 embodiment.
Figure 9:
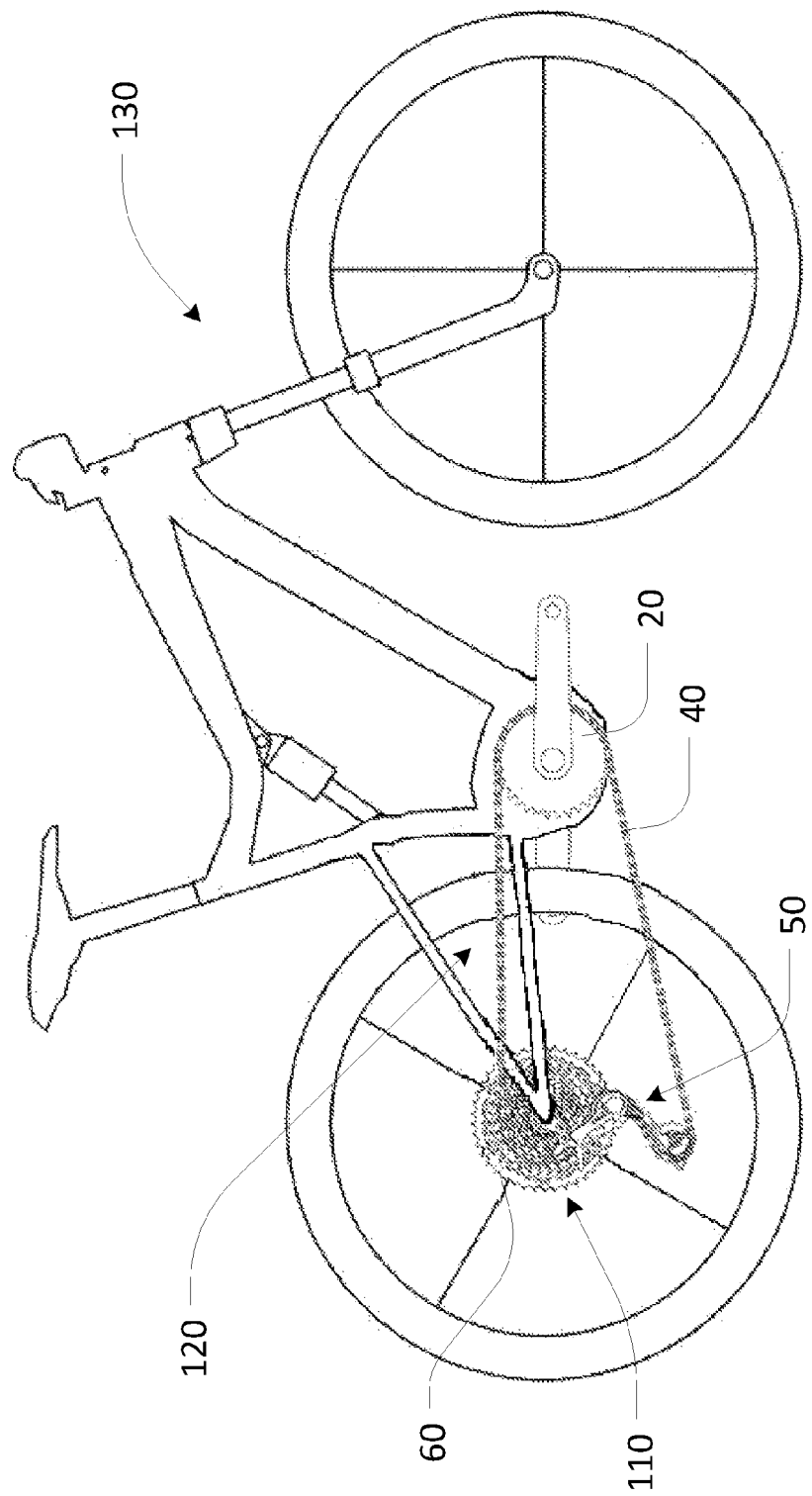
FIG. 9 is an axially forward-side elevation view of a bicycle according to an embodiment of the present invention.

Sprocket 60 may be installed for use with many conventional bicycle rear cassettes and may be compatible with a variety of conventional freehub bodies (for example, by suitably shaping radially inward edge 72 of mounting portion 70). For example, sprocket 60 may be installed for use with a ten-sprocket rear cassette, such as cassette 30 (FIG. 2). Sprockets $S_1$-$S_{10}$ (and spacers (not shown)) are removed from free hub body 32 and freehub body 32 is inserted through aperture 76 of sprocket 60. In some embodiments, radially inward edge 72 of mounting portion 70 includes a plurality of circumferentially spaced grooves 73 mateably engageable with a plurality of splines 34 circumferentially spaced about freehub body 32, such that sprocket 60 may be mounted on freehub body 32 in a conventional, non-rotatable manner. One of sprockets $S_1$-$S_{10}$ (and one or more spacers (not shown)) may be discarded (i.e., will not be reinstalled on freehub body 32) and the remaining sprockets (and spacers (not shown)) may be reinstalled on freehub body 32 such that the sprockets having a smaller diameter (and a lower teeth profile) are mounted axially forwardly of those sprockets having a larger diameter (and higher teeth profile). The assembled cassette 110, shown in FIGS. 6 and 7, includes ten sprockets including sprocket 60 mounted axially rearmost of the remaining sprockets. A drivetrain 120 comprising cassette 110 is shown in FIG. 8 and a bicycle 130 comprising cassette 110 is shown in FIG. 9. Drivetrain 120 includes chain 40, rear derailleur 50, a shift control device (not shown), and front crankset 20 that are compatible with most conventional ten sprocket rear cassettes.

Figure 6:
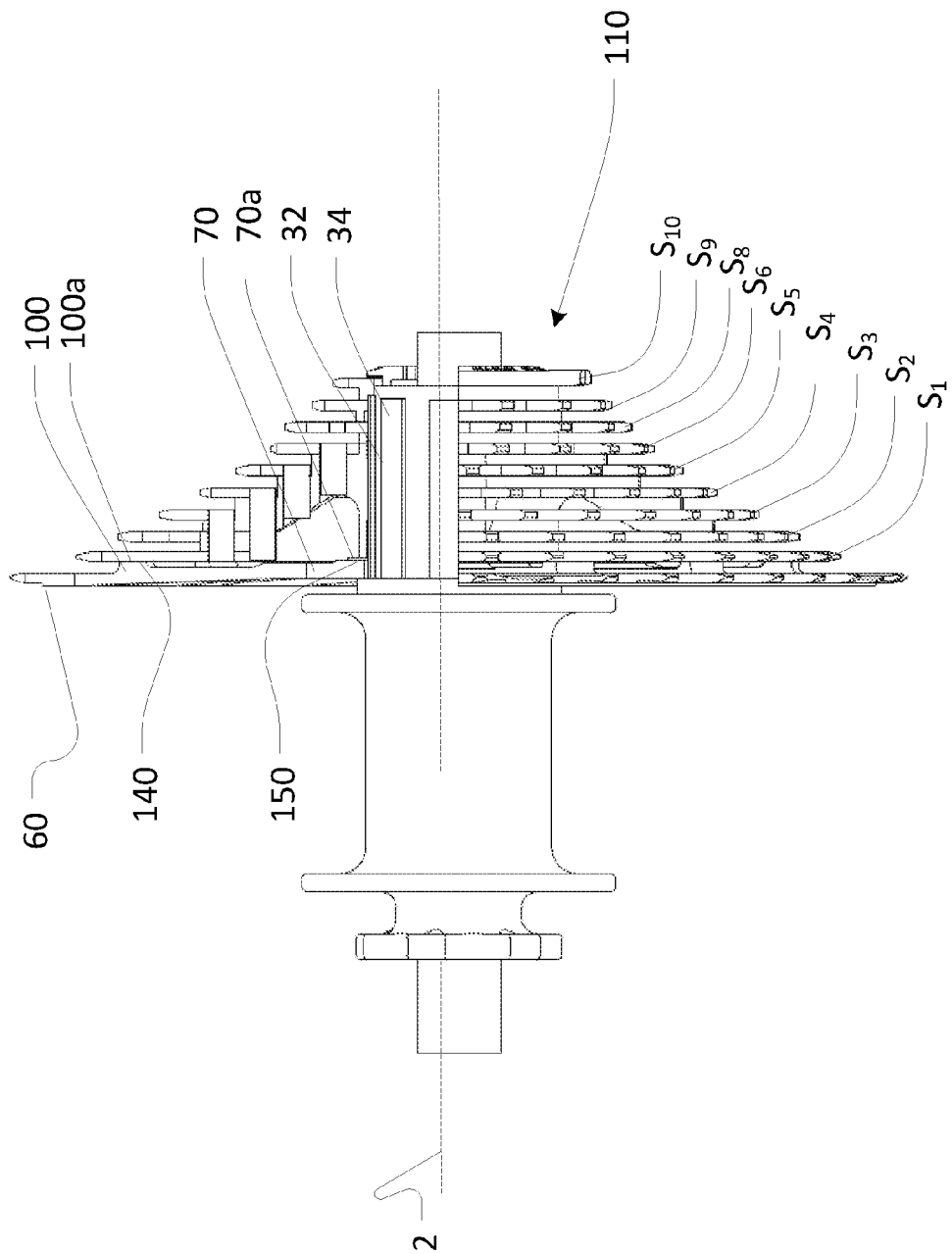
FIG. 6 is a partially broken-away side elevation view of a bicycle multi-gear rear cassette according to an embodiment of the present invention.
Figure 7:
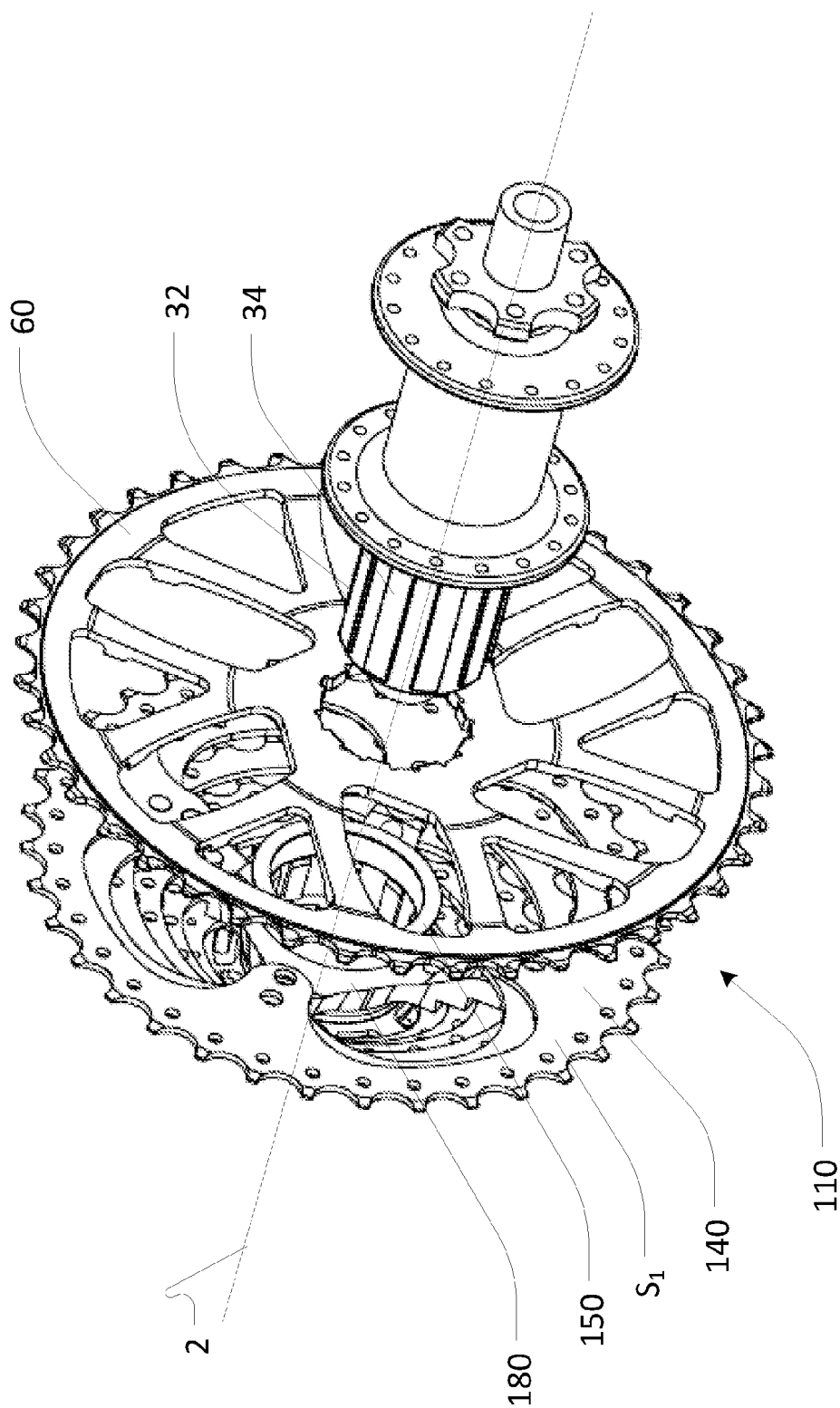
FIG. 7 is an exploded axially rearward-side isometric view of the FIG. 6 embodiment.

In the embodiment of FIGS. 6 and 7, sprocket $S_7$ having 17 teeth (17T) is discarded from cassette 110 and cassette 110 may have the following teeth (T) profiles: 11T, 13T, 15T, 19T, 21T, 24T, 28T, 32T, 36T, and 40T (i.e., 11T to 40T) or 11T, 13T, 15T, 19T, 21T, 24T, 28T, 32T, 36T, and 42T (i.e., 11T to 42T). In some embodiments, a sprocket other than sprocket $S_7$ may be discarded from cassette 110. In some embodiments, cassette 110 may have a variety of teeth profiles. While cassette 30 having ten sprockets ranging from 11T to 36T has a range of 327%, cassette 110 having ten sprockets ranging from 11T to 40T or 42T has a range of 364% or 382%. Thus, the range of gears available to a bicyclist using cassette 110 is greater than the range of gears available to a bicyclist using cassette 30.

In some embodiments, two sprockets from sprockets $S_1$-$S_{10}$ (and one spacer (not shown)) are discarded (i.e., will not be reinstalled on freehub body 32) and the remaining sprockets (and spacers (not shown)) and a new sprocket are reinstalled on freehub body 32 as described above. In some embodiments, sprockets $S_7$ and $S_8$ having 17 (17T) and 15 (15T) teeth, respectively, may be discarded and a sprocket having 16 teeth (16T) installed. In some embodiments, sprockets other than sprockets $S_7$ and $S_8$ may be discarded from the cassette and a sprocket other than a sprocket having 16 teeth (16T) may be installed. The assembled cassette includes ten sprockets (including axially rearmost sprocket 60) and may have the following teeth (T) profiles: 11T, 13T, 16T, 19T, 21T, 24T, 28T, 32T, 36T, and 40T (i.e., 11T to 40T) or 11T, 13T, 16T, 19T, 21T, 24T, 28T, 32T, 36T, and 42T (i.e., 11T to 42T). In some embodiments, the assembled cassette (including axially rearmost sprocket 60) may have a variety of teeth profiles.

The bicyclist is not required to make substantial changes to an existing drivetrain or to considerably increase the weight a bicycle to install sprocket 60 for use with a drivetrain using a conventional ten sprocket rear cassette. For example, a conventional rear derailleur may be used with cassette 110 when mounted to the rear wheel of a bicycle. To optimize shifting of the rear derailleur and movement of the bicycle chain between the sprockets of cassette 110, axially forward surface 70a of mounting portion 70 and axially forward surface 100a of each space maintaining protrusion 100 may extend further axially forwardly than axially forward surface 80a of chain engaging portion 80. In this way, the distance between axially forward surface 80a of chain engaging portion 80 and a first axially rearward surface 140 of sprocket $S_1$ adjacent to sprocket 60 may be optimized depending on the thickness of the bicycle chain. The number of space maintaining protrusions 100 may also be optimized to resist deformation of sprocket 60 due to the forces and torques associated with bicycle riding (for example, the rotational force of the chain). If the number of space maintaining protrusions 100 is too few, then the risk of deformation of sprocket 60 may become greater. In some embodiments, sprocket 60 includes six or more space maintaining protrusions 100 integrally formed with support arms 90. In some embodiments, sprocket 60 includes 10 to 12 space maintaining protrusions 100 integrally formed with support arms 90.

In some embodiments, radially inward edge 82 of chain engaging portion 80, radially outward edge 74 of mounting portion 70, and axially outwardly extending edges 91 of adjacent support arms 90 may define a plurality of apertures 160 (see FIG. 3). Apertures 160 may be located between circumferentially adjacent space maintaining protrusions 100 such that, when sprocket 60 is coaxially mounted to the freehub body of cassette 110, dirt and debris may flush between axially forward surface 80a, axially forward surface 90a, and axially forward surface 74a of sprocket 60 and the axially rearward surface of the adjacent sprocket $S_1$. In this way, dirt and debris may move radially inwardly away from chain engaging portion 80, between circumferentially adjacent space maintaining protrusions 100. In some embodiments, radially inward edge 82 of chain engaging portion 80, radially outward edge 74 of mounting portion 70, and axially outwardly extending edges 91 of adjacent support arms 90 and radially inward edge 82 of chain engaging portion 80 and axially outwardly extending edges 93 of radially outward arm portions 94, 96 may define a plurality of apertures 160, 170, respectively (see FIG. 3). Apertures 160, 170 may be located between circumferentially adjacent space maintaining protrusions 100 such that, when sprocket 60 is coaxially mounted to the freehub body of cassette 110, dirt and debris may flush between axially forward surface 80a, axially forward surface 90a, and axially forward surface 74a of sprocket 60 and the axially rearward surface of the adjacent sprocket $S_1$. In this way, dirt and debris may move radially inwardly away from chain engaging portion 80, between circumferentially adjacent space maintaining protrusions 100. In some embodiments, radially inward edge 82 of chain engaging portion 80, radially outward edge 74 of mounting portion 70, and axially outwardly extending edges 91 of adjacent support arms 90 may define a plurality of spacing portions (not shown). The spacing portions may be located between circumferentially adjacent space maintaining protrusions 100 and axially forward surface 100a of each space maintaining protrusion 100 extends further axially forwardly than an axially forward surface (not shown) of each spacing portion such that, when sprocket 60 is coaxially mounted to the freehub body of cassette 110, dirt and debris may flush between axially forward surface 80a, axially forward surface 90a, axially forward surface 74a, and the axially forward surface of each spacing portion of sprocket 60 and the axially rearward surface of the adjacent sprocket $S_1$. In this way, dirt and debris may move radially inwardly away from chain engaging portion 80, between circumferentially adjacent space maintaining protrusions 100. In some embodiments, radially inward edge 82 of chain engaging portion 80, radially outward edge 74 of mounting portion 70, and axially outwardly extending edges 91 of adjacent support arms 90 and radially inward edge 82 of chain engaging portion 80 and axially outwardly extending edges 93 of radially outward arm portions 94, 96 may define a plurality of spacing portions (not shown). The spacing portions may be located between circumferentially adjacent space maintaining protrusions 100 and axially forward surface 100a of each space maintaining protrusion 100 extends further axially forwardly than an axially forward surface (not shown) of each spacing portion such that, when sprocket 60 is coaxially mounted to the freehub body of cassette 110, dirt and debris may flush between axially forward surface 80a, axially forward surface 90a, axially forward surface 74a, and the axially forward surface of each spacing portion of sprocket 60 and the axially rearward surface of the adjacent sprocket $S_1$. In this way, dirt and debris may move radially inwardly away from chain engaging portion 80, between circumferentially adjacent space maintaining protrusions 100.

In some embodiments, axially forward surface 70a of mounting portion 70 extends further axially forwardly than axially forward surface 100a of each space maintaining protrusion 100. Since first axially rearward surface 140 of sprocket $S_1$ adjacent to sprocket 60 extends further axially rearwardly of an axially rearward surface 150 of a sprocket carrier 180 (see FIG. 6) or a second axially rearward surface (not shown) of sprocket $S_1$, as cassette 110 is assembled, axially forward surface 100a of each space maintaining protrusion 100 contacts first axially rearward surface 140 of sprocket $S_1$ before axially forward surface 70a of the mounting portion 70 contacts axially rearward surface 150 of sprocket carrier 180 or the second axially rearward surface (not shown) of adjacent sprocket $S_1$. As cassette 110 is fastened during the assembly process, sprocket 60 flexes and axially forward surface 70a of mounting portion 70 contacts axially rearward surface 150 of sprocket carrier 180 or the second axially rearward surface (not shown) of adjacent sprocket $S_1$. In this way, chain engaging portion 80 may be stiffened and/or biased axially rearwardly to optimize movement of bicycle chain 40 between sprocket 60 and adjacent sprocket $S_1$ of cassette 110. In some embodiments, chain engaging portion 80 of sprocket 60 may include a plurality of circumferentially spaced, axial recesses 88 shaped to assist upshifting of chain 40 to sprocket 60 from an adjacent sprocket of cassette 110 during an upshift operation by a rear derailleur.

A conventional bicycle is typically easiest for a bicyclist to pedal uphill when the lowest gear ratio is used (i.e., the chain mechanically engages the chainring of the front crankset having the lowest teeth profile and the sprocket of the rear cassette having the highest teeth profile. Cassette 110 comprising axially rearmost sprocket 60 facilitates uphill pedaling since a lower gear ratio is available to a bicyclist using cassette 110 than the gear ratio that is available to a bicyclist using a conventional ten sprocket rear cassette, such as cassette 30, since sprocket 60 has a teeth profile that is higher than any of the sprockets of a conventional ten sprocket cassette.

While sprocket 60 may be used with many conventional 1×10 and 2×10 drivetrains, in some embodiments, sprocket 60 may be used with a 1×10 drivetrain to optimize the gear ratio available to a bicyclist while eliminating the front derailleur, a front chainring, a shift control device, and the weight (and mechanical problems) associated with these extra components.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A bicycle sprocket for use with a multi-gear rear cassette, the sprocket comprising:
   a chain engaging portion having a generally annular shape about a central axis, a radially outward edge of the chain engaging portion comprising a plurality of circumferentially spaced and radially outwardly extending teeth for mechanical engagement with a bicycle chain;
   a mounting portion having a generally annular shape about the central axis, a radially inward edge of the mounting portion defining an aperture shaped to receive therein a freehub body and a radially outward edge of the mounting portion radially spaced apart from a radially inward edge of the chain engaging portion;
   a plurality of support arms, integrally formed with the chain engaging portion and with the mounting portion, extending radially outwardly from the radially outward edge of the mounting portion to the radially inward edge of the chain engaging portion; and
   a plurality of space maintaining protrusions, each space maintaining protrusion integrally formed with and extending axially forwardly from an axially forward surface of a corresponding support arm.

2. The bicycle sprocket according to claim 1, wherein the support arms are circumferentially spaced apart from one another about the radially outward edge of the mounting portion.

3. The bicycle sprocket according to claim 1, wherein the support arms are circumferentially spaced apart from one another about the radially inward edge of the chain engaging portion.

4. The bicycle sprocket according to claim 1, wherein each support arm comprises a radially inward arm portion and a plurality of radially outward arm portions, the radially inward arm portion extending radially outwardly from the radially outward edge of the mounting portion and the plurality of radially outward arm portions extending radially outwardly from a radially outward edge of the radially inward arm portion to the radially inward edge of the chain engaging portion.

5. The bicycle sprocket according to claim 4, wherein each space maintaining protrusion extends axially forwardly from an axially forward surface of a corresponding radially outward arm portion and is integrally formed therewith.

6. The bicycle sprocket according to claim 1, wherein an axially forward surface of the mounting portion and an axially forward surface of each space maintaining protrusion extend further axially forwardly than an axially forward surface of the chain engaging portion.

7. The bicycle sprocket according to claim 6, wherein the axially forward surface of the mounting portion extends further axially forwardly than the axially forward surface of each space maintaining protrusion.

8. The bicycle sprocket according to claim 1, wherein the radially inward edge of the mounting portion comprises a plurality of circumferentially spaced grooves mateably engageable with a plurality of splines circumferentially spaced about the freehub body.

9. The bicycle sprocket according to claim 1, wherein the chain engaging portion comprises a plurality of circumferentially spaced, axial recesses shaped for upshifting a bicycle chain to the rear bicycle sprocket from an adjacent sprocket of the rear cassette.

10. The bicycle sprocket according to claim 1, wherein the sprocket is constructed from a metallic material.

11. A bicycle multi-gear rear cassette having a plurality of sprockets coaxially mounted to a freehub body, wherein the plurality of sprockets includes an axially rearmost sprocket, the axially rearmost sprocket comprising:
    a chain engaging portion having a generally annular shape about a central axis, a radially outward edge of the chain engaging portion comprising a plurality of circumferentially spaced and radially outwardly extending teeth for mechanical engagement with a bicycle chain;
    a mounting portion having a generally annular shape about the central axis, a radially inward edge of the mounting portion defining an aperture shaped to receive therein a freehub body and a radially outward edge of the mounting portion radially spaced apart from a radially inward edge of the chain engaging portion;
    a plurality of support arms, integrally formed with the chain engaging portion and with the mounting portion, extending radially outwardly from the radially outward edge of the mounting portion to the radially inward edge of the chain engaging portion; and
    a plurality of space maintaining protrusions, each space maintaining protrusion integrally formed with and extending axially forwardly from an axially forward surface of a corresponding support arm.

12. The multi-gear rear cassette according to claim 11, wherein each support arm comprises a radially inward arm portion and a plurality of radially outward arm portions, the radially inward arm portion extending radially outwardly from the radially outward edge of the mounting portion and the plurality of radially outward arm portions extending radially outwardly from a radially outward edge of the radially inward arm portion to the radially inward edge of the chain engaging portion.

13. The multi-gear rear cassette according to claim 12, wherein each space maintaining protrusion extends axially forwardly from an axially forward surface of a corresponding radially outward arm portion and is integrally formed therewith.

14. The multi-gear rear cassette according to claim 11, wherein an axially forward surface of the mounting portion and an axially forward surface of each space maintaining protrusion extend further axially forwardly than an axially forward surface of the chain engaging portion.

15. The multi-gear rear cassette according to claim 14, wherein the axially forward surface of the mounting portion extends further axially forwardly than the axially forward surface of each space maintaining protrusion.

16. A bicycle comprising a multi-gear rear cassette having a plurality of sprockets coaxially mounted to a freehub body, wherein the plurality of sprockets includes an axially rearmost sprocket, the axially rearmost sprocket comprising:

a chain engaging portion having a generally annular shape about a central axis, a radially outward edge of the chain engaging portion comprising a plurality of circumferentially spaced and radially outwardly extending teeth for mechanical engagement with a bicycle chain;

a mounting portion having a generally annular shape about the central axis, a radially inward edge of the mounting portion defining an aperture shaped to receive therein a freehub body and a radially outward edge of the mounting portion radially spaced apart from a radially inward edge of the chain engaging portion;

a plurality of support arms, integrally formed with the chain engaging portion and with the mounting portion, extending radially outwardly from the radially outward edge of the mounting portion to the radially inward edge of the chain engaging portion; and a plurality of space maintaining protrusions, each space maintaining protrusion integrally formed with and extending axially forwardly from an axially forward surface of a corresponding support arm.

17. The bicycle according to claim 16, wherein each support arm comprises a radially inward arm portion and a plurality of radially outward arm portions, the radially inward arm portion extending radially outwardly from the radially outward edge of the mounting portion and the plurality of radially outward arm portions extending radially outwardly from a radially outward edge of the radially inward arm portion to the radially inward edge of the chain engaging portion.

18. The bicycle according to claim 17, wherein each space maintaining protrusion extends axially forwardly from an axially forward surface of a corresponding radially outward arm portion and is integrally formed therewith.

19. The bicycle according to claim 16, wherein an axially forward surface of the mounting portion and an axially forward surface of each space maintaining protrusion extend further axially forwardly than an axially forward surface of the chain engaging portion.

20. The bicycle according to claim 19, wherein the axially forward surface of the mounting portion extends further axially forwardly than the axially forward surface of each space maintaining protrusion.

\* \* \* \* \*